United States Patent Office 3,164,460
Patented Jan. 5, 1965

3,164,460
METHOD OF CONTROLLING UNDESIRABLE PLANT GROWTH
Sidney B. Richter, Chicago, Ill., assignor to Velsicol Chemical Corporation, Chicago, Ill., a corporation of Illinois
No Drawing. Filed Dec. 4, 1961, Ser. No. 156,963
12 Claims. (Cl. 71—2.6)

This invention relates to a method of controlling undesirable plant growth. More specifically, this invention relates to the method of controlling undesirable plant growth with a compound of the formula

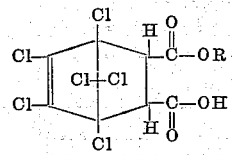

wherein R is selected from the group consisting of alkyl, haloalkyl, alkenyl, and haloalkenyl, groups containing up to 10 carbon atoms.

Compounds of the above formula are monoesters of chlorendic acid, which is also referred to as 1,4,5,6,7,7-hexachlorobicyclo - (2.2.1) - 5 - heptene-2,3-dicarboxylic acid. The monoesters are often referred to as the monoester of 1,4,5,6,7,7 - hexachlorobicyclo - (2.2.1) - 5-heptene-2-carboxy-3-carboxylate. For example, the methyl ester would be methyl 1,4,5,6,7,7-hexachlorobicyclo-(2.2.1)-5-heptene-2-carboxy-3-carboxylate. For the sake of brevity, the monesters will hereinafter be referred to as the "Monoesters of chlorendic acid." For example, methyl 1,4,5,6,7,7 - hexachlorobicyclo-(2.2.1)-5-heptene-2-carboxy-3-carboxylate, will be referred to as "monomethyl chlorendate."

Prior to the present invention many organic and inorganic substances have been proposed and used in attempts to control undesirable plants. While several of these substances were partially successful, the problem of controlling the vast number of species of undesirable plant life still exists. Some of the previously proposed substances are toxic to only a few species of plant life, while others are excessively toxic and indiscriminately destroy both desirable and undesirable plant life. Thus, although many substances have heretofore been proposed as herbicides, the problem of the effective and selective control of undesirable plant life still exists.

Therefore, one object of the present invention is the destruction of undesirable plant life.

Another object of the present invention is to provide a method for the control of undesirable plant life.

Still another object is to provide a method for the destruction of growing weeds.

These and other objects of the present invention will be readily apparent from the ensuing description.

The essential active ingredients of the herbicidal compositions used in the method of the present invention, described herein, can be readily prepared, for example, by the reaction of chlorendic anhydride with a suitable alcohol. The reaction takes place rapidly, no catalyst being necessary. While the lower alcohols react readily with chlorendic anhydride at normal room temperature, it is more convenient to perform the reaction with heating. It is preferred to effect the reaction at the reflux temperature of the alcohol-chlorendic anhydride reaction mixture if a lower alcohol is used, or at a temperature of between about 75° C. and 150° C. with the higher molecular weight alcohols. An inert organic solvent may be used, if desired, but it is preferred to perform the reaction without a solvent. Dioxane is one example of a suitable inert organic solvent.

After the reaction is complete, the desired ester can be readily recovered from the reaction solution by methods common to the art, as for example, by precipitation of the ester from the reaction solution by the addition of water thereto. The crude ester thus obtained may be used in the process of the present invention as such, or may be purified by recrystallization from a suitable solvent.

The alcohols useful in the preparation of the monoesters utilized in the method of the present invention can be selected from the alkanols, the haloalkanols, the alkenols, and the haloalkenols. Preferably, the alcohol used contains from 1 to about 10 carbon atoms. When halo-alcohols are utilized, it is preferred to use chlorine and/or bromine substituted alcohols.

Among the typical alkanol and haloalkanols useful as ingredients in the preparation of the monoesters described above are: metthanol, ethanol, ethylene chlorohydrin, ethylene bromohydrin, dichloroethanol, dibromoethanol, propanol, propylene chlorohydrin, propylene bromohydrin, glycerol dichlorohydrin, glycerol dibromohydrin, butanol, chlorobutanol, bromobutanol, dichlorobutanol, dibromobutanol, amyl alcohol, chloropentanol, bromoamyl alcohol, dichloropentanol, dibromopentanol, hexyl alcohol, heptyl alcohol, octyl alcohol, nonyl alcohol, decyl alcohol, their chlorinated and brominated substituted derivataives, their isomers, and the like.

Included in the suitable alkenols and haloalkenols are: allyl alcohol, chlorallyl alcohol, bromoallyl alcohol, crotyl alcohol, chlorocrotyl alcohol, bromocrotyl alcohol, methylvinylcarbinol, allyl carbinol, methylpropenylcarbinol, 4-pentenol, methylallylcarbinol, dimethylallylcarbinol, and the like.

For practical use as herbicides, the compounds used in the method of this invention are formulated with inert carriers to obtain proper concentrations and to facilitate handling. For example, these compounds can be formulated into dusts by combining them with such inert substances as talcs or clays. The said compounds are particularly suited to such dust formulations, and dusts containing from 5 to 25 percent by weight of active compound are convenient for use in the field. The compounds of this invention, however, are preferably applied as sprays. These can be made as simple solutions by dissolving the compounds in organic solvents such as xylene, kerosene, or the methylated naphthalenes. Solvent solutions of these compounds, which ordinarily are liquids at room temperature, are particularly suited to formulation by this method.

The compounds used in the method of this invention can also be emulsified or suspended in water by the addition of emulsifiers and wetting agents. The formulations of these active herbicidal compounds are either applied directly to the plants to be controlled, or the soil in which the plants are growing can be treated. Substances such as other pesticides, stabilizers, activators, synergists, spreaders and adhesives can be added to the formulations if desired. There is no significant difference in effect from the amount of water or organic solvent for diluting these compounds, providing the same amount of chemical is distributed evenly over a given area. Such distribution can be obtained, for example, with low-pressure, low-volume sprays at the rate of about 10 gallons of spray per acre.

In applying the compounds, consideration must be given to the nature and stage of growth of the crop, the species of weeds present, the stage of growth of the weeds, environmental factors influencing the rate and vigor of the weed growth, weather conditions at the time of application and immediately following, and the dosage to be applied to a given area. Weeds are most susceptible when they are small and growing rapidly. Early application, therefore, results in better control with less chemical and increased yields because of the early destruction of the competing weeds. The larger and older the weeds the higher the concentration needed to kill them. Summer annuals such as lambs-quarters, pigweeds, cocklebur, and sunflower should be sprayed when they are less than 4 inches high. Winter annuals such as various mustards, fan-weed, yellow star-thistle, and wild radish are most easily killed while they are still in the rosette stage. Usually weeds growing rapidly under optimum conditions are relatively susceptible, whereas those growing under adverse conditions tend to be resistant to the herbicide sprays.

The effectiveness of these compounds in small quantities makes them economically sound for weed control on large areas, with a great saving in labor and cost, in addition to corresponding crop increases. These compounds are particularly valuable in weed control because they are harmful to many weeds but harmless or relatively harmless to some cultivated crops. Minute quantities in contact with plant tissues may be absorbed and translocated to all parts of the plant, causing striking changes in their form and functions and often resulting in their death. The actual amount of compound to be used depends on a variety of factors but is influenced primarily by the species of undesirable plant to be controlled. Thus, while fractions of a pound of actual compound are often sufficient for post-emergence weed control on an acre of corn, seed flax, perennial grass seed crops, pastures or grazing areas (without legumes), wheat, and the like, the particular species of weeds encountered in evergreen and deciduous dormant nursery stock, nursery conifers, waste areas, woody brush, and the like may require the use of one or more pounds of compound per acre for good control. Dosage adjustments with the low-volume, low-pressure applications suggested can be made by changing the nozzle size, nozzle spacing, pressure, or traveling rate of the spray equipment.

The manner in which the aforesaid compounds can be prepared and utilized in the method of the present invention is illustrated in the following examples:

EXAMPLE 1

*Preparation of Monoethyl Chlorendate*

Chlorendic anhydride (10 g.) and absolute ethyl alcohol (50 ml.) were heated at reflux for 21 hours. The solution was distilled to reduce its volume to about 40 ml. and was cooled to −5° C. Water (100 ml.) was added and the mixture stirred. The desired monoethyl chlorendate crystallized from the mixture and was collected by filtration, washed with water, and dried in a dessicator containing anhydrous potassium hydroxide. The monoester had a melting point of 125–126° C. The monoester was purified by recrystallization from an ethanol-heptane solution.

EXAMPLE 2

*Preparation of Monochloroethyl Chlorendate*

Chlorendic anhydride (37.1 g.; 0.1 mole), ethylene chlorohydrin (8.1 g.; 0.1 mole), and anhydrous dioxane (75 ml.) were mixed and heated at reflux for 24 hours. The soluton was distilled to remove most of the dioxane (approx. 68 ml.). The solution was poured into cold water, extracted therefrom with isopropyl ether and dried over an anhydrous drying agent. The isopropyl ether was removed by distillation in vacuo, and the liquid residue was stirred into pentane. The crude monochloroethyl chlorendate precipitated therefrom. Upon separation from the pentane and drying the crude monoester had a melting point of 150–5° C. The crude product was dissolved in heptane-benzene solution, filtered, and slowly cooled. The hard crystalline almost-white product was washed with heptane, dried in hot air and in vacuo over potassium hydroxide to yield the purified monoester having a melting point of 155–6° C. A sample of the monoester after a second recrystallization had the following elemental analysis as calculated for $C_{11}H_7O_4Cl_7$:

|  | C | H | Cl |
|---|---|---|---|
| Theoretical, percent | 29.27 | 1.56 | 54.99 |
| Found, percent | 29.40 | 1.64 | 55.17 |

EXAMPLE 3

*Preparation of Monoallyl Chlorendate*

Chlorendic anhydride (37.1 g.; 0.1 mole, allyl alcohol (6.4 g.; 0.11 mole), and heptane (250 ml.) were mixed and heated at reflux for about 24 hours. The solution was cooled to room temperature. Crude monoester, having a melting point of 150–154° C. crystallized from solution. The crude product was recrystallized from benzene-heptane solution to yield monoallyl chlorendate, having a melting point of 153–154° C. and the following elemental analysis as calculated for $C_{12}H_8O_4Cl_6$:

|  | C | H | Cl |
|---|---|---|---|
| Theoretical, percent | 33.60 | 1.87 | 49.59 |
| Found, percent | 33.58 | 2.01 | 49.61 |

EXAMPLE 4

*Preparation of Monomethyl Chlorendate*

Chlorendic anhydride (186 g.; 0.5 mole), reagent grade methanol (150 ml.), benzene (500 ml.), and sulfuric acid (50 drops; approx. 2 g.) were mixed and heated at reflux for 18.5 hours. The benzene and unreacted alcohol were removed by distillation in vacuo. The liquid residue was diluted with water (100 ml.) and the mixture filtered. The liquid residue was mixed with 5% aqueous sodium bicarbonate solution (400 ml.) and filtered. 5% aqueous hydrochloric acid solution was added to the filtrate and the resulting mixture was filtered. The residue was recrystallized several times from benzene and then toluene to obtain monomethyl chlorendate as a solid melting 120–122° C.

The method described in the previous examples can be utilized to prepare the other monoesters of chlorendic acid, as illustrated in the following examples wherein the reactants and the product obtained therefrom are given:

EXAMPLE 5

Chlorendic anhydride+ethylene bromohydrin=monobromoethyl chlorendate.

EXAMPLE 6

Chlorendic anhydride+2,2-dichloroethanol-1=mono-(2,2-dichloroethyl) chlorendate.

EXAMPLE 7

Chlorendic anhydride+2,2,2-trichloroethanol-1=mono-(2,2,2-trichloroethyl) chlorendate.

EXAMPLE 8

Chlorendic anhydride+2,2-dibromoethanol-1=mono-(2,2-dibromoethyl) chlorendate.

EXAMPLE 9

Chlorendic anhydride+propanol=monopropyl chlorendate.

EXAMPLE 10

Chlorendic anhydride+3-chloropropanol-1=mono-(3-chloropropyl) chlorendate.

EXAMPLE 11

Chlorendic anhydride+2,3-dibromopropanol-1=mono-(2,3-dibromopropyl) chlorendate.

EXAMPLE 12

Chlorendic anhydride+butanol-1=mono-n-butyl chlorendate.

EXAMPLE 13

Chlorendic anhydride+3-chlorobutanol-1=mono-(3-chlorobutyl) chlorendate.

EXAMPLE 14

Chlorendic anhydride+n-amyl alcohol=mono-n-amyl chlorendate.

EXAMPLE 15

Chlorendic anhydride+hexanol-1=mono-n-hexyl chlorendate.

EXAMPLE 16

Chlorendic anhydride+-ethylhexanol-1=mono-(2-ethylhexyl) chlorendate.

EXAMPLE 17

Chlorendic anhydride+decanol-1=mono-n-decyl chlorendate.

EXAMPLE 18

Chlorendic anhydride+3-chloroallyl alcohol=mono-(3-chloroallyl) chlorendate.

EXAMPLE 19

Chlorendic anhydride+crotyl alcohol=monocrotyl chlorendate.

EXAMPLE 20

Chlorendic anhydride+2-bromocrotyl alcohol=mono-(2-bromocrotyl) chlorendate.

The following examples are illustrative of the preparation of the concentrated formulations of the monoesters of chlorendic acid.

EXAMPLE 21

*Preparation of an Emulsifiable Concentrate of Monoethyl Chlorendate*

The following concentrate is prepared by mixing the ingredients intimately in the given percentage proportions by weight:

| | Percent |
|---|---|
| Product of Example 1 | 25 |
| Antarox A-400 | 40 |
| Methanol | 35 |

"Antarox A-400" is the trade name under which a nonionic detergent of the aromatic polyethylene glycol ether type is sold. The above concentrate is diluted with water to the desired concentration for use.

EXAMPLE 22

*Preparation of an Emulsifiable Concentrate of Monochloroethyl Chlorendate*

The following ingredients are mixed thoroughly in the given percentage proportions by weight:

| | Percent |
|---|---|
| Product by Example 2 | 59 |
| Xylene | 10 |
| Triton X-100 | 5 |
| Kerosene | 26 |

"Triton X-100" is the trade name under which an emulsifier of the alkyl aryl polyether alcohol type is sold. The above concentrate is diluted with water to the desired concentration for use.

EXAMPLE 23

*Preparation of a Dust from Monoallyl Chlorendate*

The product of Example 3 (10% by weight) and talc (90% by weight) are combined and ground to the desired particle size in a mechanical grinder-blender.

The herbicidal activity of chemical compounds is often demonstrated by the ability of the chemicals to kill or arrest the growth of tomato plants or weeds, such as those previously named. The tomato plant is readily grown and maintained under uniform conditions for experimental purposes in greenhouses, and its response to chemicals is very similar to that observed for a wide variety of economically important species of undesirable plant life in the field.

The herbicidal effectiveness of the method of this invention, for example, can be demonstrated in greenhouse experiments on young potted tomato plants (Bonny Best variety).

EXAMPLE 24

Monoallyl chlorendate was formulated into a 10% wettable powder and dispersed in water to a concentration of 5,000 parts per million actual chemical. Ten milliliters of an aliquot portion of the dispersion was applied to the soil surface of young potted tomato plants approximately 5 to 7 inches tall. In order to avoid undue concentration or accumulation of the chemical in any given area, 5 holes the size of a pencil and about one inch deep were punched in the soil surface around the shoot and the 10 ml. application divided equally among the 5 holes. Three replicates were used for each treatment. Treated and untreated plants were then held under greenhouse conditions for 10 days, provided with subterranean watering, and observed for response to treatment. After 10 days the treated plants were dead with their stems dried up and their root structures about 1/32 of the size of the normal root structure, while no injury was observed in the untreated plants which had normal root structure.

The herbicidal effectiveness of the method of this invention, for example, can also be demonstrated in greenhouse experiments on radish seeds.

EXAMPLE 25

Monoallyl chlorendate was formulated into a wettable powder and dispersed in water to 1,000 parts per million actual chemical. Five cc. of an aliquot portion of the dispersion were applied to 25 radish seeds on a moistened filter paper in a Petri dish. Three replicates were used for each treatment. Petri dishes containing treated and untreated seeds were then held under constant temperature (70° F.±1°) and relative humidity (40%±2%) for 7 days. Post germination mortality and related changes were observed as shown in the following table.

RESULTS OF EXPERIMENT

| Sample | Post-Germination Mortality, percent | Average Lgth., cm. | | Root Structure |
|---|---|---|---|---|
| | | Root | Stem | |
| Monoallyl Chlorendate | 100.0 | 0.1 | 0.2 | Black Mold Inhibited. |
| Untreated Control | 0.0 | 5.0 | 2.0 | Normal. |

I claim:

1. A method of destroying growing weeds which comprises contacting said weeds with a herbicidal composition comprising an inert carrier and, in a quantity which is herbicidally toxic to said weeds, a compound of the formula

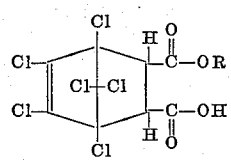

wherein R is selected from the group consisting of alkyl, haloalkyl, alkenyl, and haloalkenyl containing up to ten carbon atoms.

2. A method of destroying growing weeds which comprises contacting the soil in which said weeds are growing with a herbicidal composition comprising an inert carrier and, in a quantity which is herbicidally toxic to said weeds, a compound of the formula

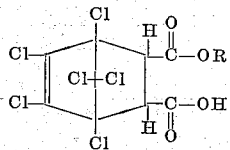

wherein R is selected from the group consisting of alkyl, haloalkyl, alkenyl, and haloalkenyl containing up to ten carbon atoms.

3. A method of destroying growing weeds which comprises contacting the seeds of said weeds prior to germination, with a herbicidal composition comprising an inert carrier and, in a quantity which is herbicidally toxic to said weeds, a compound of the formula

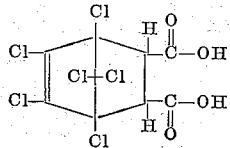

wherein R is selected from the group consisting of alkyl, haloalkyl, alkenyl, and haloalkenyl containing up to ten carbon atoms.

4. A method of destroying growing weeds which comprises contacting said weeds with a herbicidal composition comprising an inert carrier and as the essential active ingredient, in a quantity which is herbicidally toxic to said weeds, monoethyl chlorendate.

5. A method of destroying growing weeds which comprises contacting said weeds with a herbicidal composition comprising an inert carrier and as the essential active ingredient, in a quantity which is herbicidally toxic to said weeds, monochloroethyl chlorendate.

6. A method of destroying growing weeds which comprises contacting said weeds with a herbicidal composition comprising an inert carrier and as the essential active ingredient, in a quantity which is herbicidally toxic to said weeds, monoallyl chlorendate.

7. A method of destroying growing weeds which comprises contacting said weeds with a herbicidal composition comprising an inert carrier and as the essential active ingredient, in a quantity which is herbicidally toxic to said weeds, monomethyl chlorendate.

8. A method of destroying growing weeds which comprises contacting said weeds with a herbicidal composition comprising an inert carrier and as the essential active ingredient, in a quantity which is herbicidally toxic to said weeds, mono-(2-ethylhexyl) chlorendate.

9. A method of destroying growing weeds which comprises contacting the soil in which said weeds are growing with a herbicidal composition comprising an inert carrier and as the essential active ingredient, in a quantity which is herbicidally toxic to said weeds, monoethyl chlorendate.

10. A method of destroying growing weeds which comprises contacting the soil in which said weeds are growing with a herbicidal composition comprising an inert carrier and as the essential active ingredient, in a quantity which is herbicidally toxic to said weeds, monochloroethyl chlorendate.

11. A method of destroying growing weeds which comprises contacting the soil in which said weeds are growing with a herbicidal composition comprising an inert carrier and as the essential active ingredient, in a quantity which is herbicidally toxic to said weeds, monoallyl chlorendate.

12. A method of destroying growing weeds which comprises contacting the soil in which said weeds are growing with a herbicidal composition comprising an inert carrier and as the essential active ingredient, in a quantity which is herbicidally toxic to said weeds, mono-(2-ethylhexyl) chlorendate.

References Cited in the file of this patent
UNITED STATES PATENTS

| | | |
|---|---|---|
| 2,758,918 | Soloway et al. | Aug. 14, 1956 |
| 2,771,423 | Dorinson | Nov. 20, 1956 |

UNITED STATES PATENT OFFICE
CERTIFICATE OF CORRECTION

Patent No. 3,164,460            January 5, 1965

Sidney B. Richter

It is hereby certified that error appears in the above numbered patent requiring correction and that the said Letters Patent should read as corrected below.

Column 1, line 32, for "monesters" read -- monoesters --; column 2, line 18, for "metthanol" read -- methanol --; line 27, for "derivataives" read -- derivatives --; line 29, for "chlorallyl" read -- chloroallyl --; column 5, EXAMPLE 16, for "-ethylhexanol" read -- 2-ethylhexanol --; column 7, lines 18 to 23, for the upper right-hand portion of the formula reading:

(SEAL)      Signed and sealed this 18th day of May 1965.

Attest:

ERNEST W. SWIDER
Attesting Officer

EDWARD J. BRENNER
Commissioner of Patents